United States Patent
Ansart et al.

Patent Number: 6,105,371
Date of Patent: Aug. 22, 2000

[54] CONTROL OF COOLING FLOWS FOR HIGH-TEMPERATURE COMBUSTION CHAMBERS HAVING INCREASED PERMEABILITY IN THE DOWNSTREAM DIRECTION

[75] Inventors: Denis Roger Henri Ansart, Bois le Roi; Denis Jean Maurice Sandelis, Nangis, both of France

[73] Assignee: Societe Nationale d'Etude et de Construction de Moteurs d'Aviation "Snecma", Paris, France

[21] Appl. No.: 09/006,955

[22] Filed: Jan. 14, 1998

[30] Foreign Application Priority Data

Jan. 16, 1997 [FR] France .................. 97.00384

[51] Int. Cl.$^7$ .................. F02K 3/06; F02C 1/00
[52] U.S. Cl. .................. 60/754; 60/757; 60/747
[58] Field of Search .................. 60/747, 752, 754, 60/755, 756, 757

[56] References Cited

U.S. PATENT DOCUMENTS

| | | | |
|---|---|---|---|
| 3,557,553 | 1/1971 | Schmitz | 60/754 |
| 3,584,972 | 6/1971 | Bratkovich | 60/754 |
| 3,623,711 | 11/1971 | Thorstenson | 60/754 |
| 4,242,871 | 1/1981 | Breton | 60/757 |
| 4,315,406 | 2/1982 | Bhangu et al. | 60/754 |
| 5,398,496 | 3/1995 | Taylor et al. | 60/752 |
| 5,524,430 | 6/1996 | Mazeaud et al. | 60/752 |
| 5,758,504 | 6/1998 | Abreu et al. | 60/754 |

FOREIGN PATENT DOCUMENTS

| | | |
|---|---|---|
| 0 615 055 A1 | 9/1994 | European Pat. Off. . |
| 2 635 577 | 2/1990 | France . |
| 58-182034 | 10/1983 | Japan .................. 60/757 |
| 980363 | 1/1965 | United Kingdom . |

*Primary Examiner*—Ted Kim
*Attorney, Agent, or Firm*—Oblon, Spivak, McClelland, Maier & Neustadt, P.C.

[57] ABSTRACT

The invention relates to the control of air flows for cooling the axial walls of a high-temperature combustion chamber in which the walls are provided with through holes forming multiple perforations, and involves arranging the multiple perforations so that the cooling airflow permeability of the walls in the downstream zone of the chamber decreases in the downstream direction in order to compensate for the effects of the increase in pressure drop due to variation of the gas flow velocity. The invention is particularly applicable to sharply convergent combustion chambers such as twin-head combustion chambers.

1 Claim, 3 Drawing Sheets

6,105,371

CONTROL OF COOLING FLOWS FOR HIGH-TEMPERATURE COMBUSTION CHAMBERS HAVING INCREASED PERMEABILITY IN THE DOWNSTREAM DIRECTION

BACKGROUND OF THE INVENTION

1. Field of the Invention

The invention relates to the control of cooling flows for the walls of high-temperature combustion chambers such as are used in turbomachines, and especially turboshaft engines for aircraft.

2. Summary of the Prior Art

The requirements for such a combustion chamber include a very low pressure drop along the combustion chamber walls to ensure minimum impairment of the energy of the cooling fluid and to produce a very uniform peripheral and radial temperature distribution at the turbine inlet downstream from the chamber.

The thermodynamic cycles currently chosen for civil and military turbojet engines result in ever-higher temperatures at the combustion chamber outlet, and these high temperatures help to reduce the specific fuel consumption of the engine.

However, increasing the temperature in the combustion chamber leads to higher Mach numbers, which may rise locally to a value M=0.25. Also, in combustion chambers which are sharply convergent in their downstream zone, and particularly in combustion chambers having two separate heads, the Mach number changes appreciably towards the downstream end of the chamber. This change affects combustion chamber performance and, in particular, the rate of flow of cooling air.

The reason for this is that an increase in Mach numbers in the combustion chamber towards its downstream end reduces the static pressure in the combustion chamber in the direction of gas flow. This causes an increase in the pressure drop along the combustion chamber walls towards the downstream end. However, for a given configuration of the cooling air inlet holes the air flow rate therethrough depends upon the pressure drop and varies in the same sense as the latter.

The pressure drop may almost double in value in the convergent zone, with the result that the rate of cooling air flow may experience a local increase of 30% if the combustion chamber walls are of uniform permeability throughout their length. The accentuation of the radial profile of twin-head combustion chambers increases these pressure drops and cooling flow rate variations.

An increase in the cooling flow rate at the combustion chamber outlet is incompatible with the temperature profiles which are desirable at the combustion chamber outlet. These include the radial temperature factor (F.R.T.) and the local temperature factor (F.L.T.) which characterize the hottest point of the temperature profiles.

SUMMARY OF THE INVENTION

It is therefore an object of the invention to optimize the temperature profile at the outlet of a very high temperature combustion chamber by controlling the rate of flow of cooling air in the wall zones disposed in the downstream part of the combustion chamber.

To this end, the invention provides a combustion chamber, particularly for a turbomachine, said chamber having an axis of symmetry and being bounded by two mutually spaced annular walls, an end member which is disposed transversely to said axis of symmetry at an upstream position with respect to the general direction of gas flow in said combustion chamber, and means defining an outlet opening at the downstream end of said combustion chamber, each of said annular walls being provided with a plurality of through holes forming multiple perforations for the passage of air for cooling said walls, and said combustion chamber having a downstream zone in which the cross-section of said combustion chamber converges towards said outlet opening at the downstream end thereof so as to increase the velocity of the gas flow towards said outlet opening and locally increase the pressure drop along said annular walls in said downstream zone, wherein said multiple perforations are made such that the cooling air flow permeability of said annular walls in said downstream zone decreases towards the downstream end of said combustion chamber in order to compensate for the effects of the increase in said pressure drop, said cooling air flow permeability being defined as the cooling air flow rate which can pass at a given pressure through a given area of wall experiencing a given pressure drop.

This variation in the air flow permeability of the chamber walls can be achieved by reducing the number of through holes per unit area of the walls, by varying the dimensions or angle of inclination of the through holes, or by increasing the thickness of the walls from the upstream end to the downstream end of the downstream zone of the chamber.

Other features and advantages of the invention will become apparent from the following description of the preferred embodiments, given by way of example only, with reference to the accompanying drawings.

DESCRIPTION OF THE PREFERRED EMBODIMENTS

Figure 1:
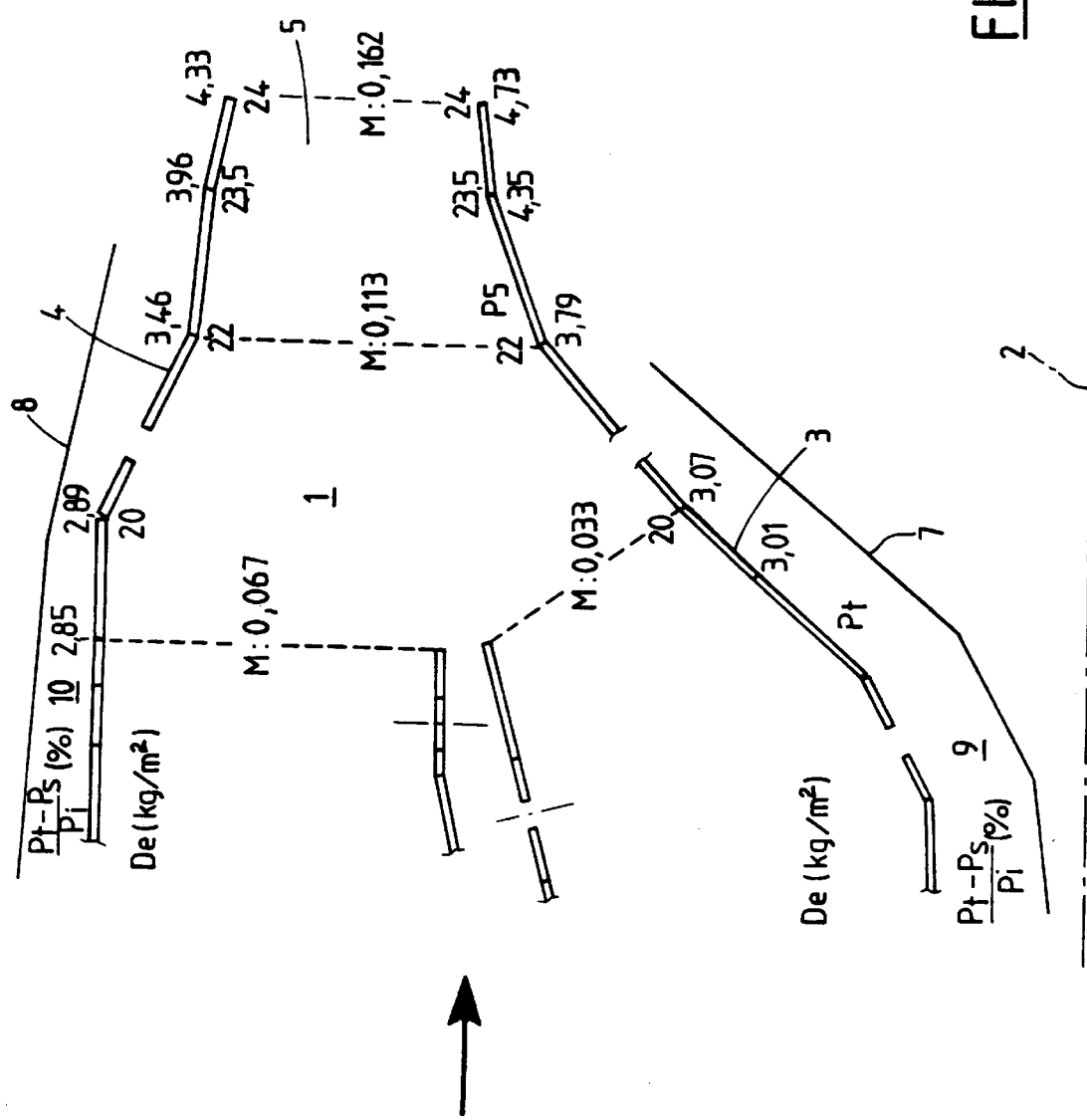
FIG. 1 shows a diagrammatic radial sectional view of the downstream zone of a conventional twin-head annular combustion chamber in which the combustion chamber walls have a substantially homogeneous permeability to the flow of cooling air, the drawing indicating the Mach values M, the pressure drops, and the cooling air flow rates between the upstream and downstream ends of the zone.

FIG. 1 shows the downstream part of a twin-head annular combustion chamber 1 which has an axis of symmetry 2 and which is defined by an inner annular axial wall 3 and an outer annular axial wall 4 spaced apart from one another. The axial walls 3, 4 define an annular outlet 5 at the downstream end of the chamber, through which the combustion gases pass from the chamber to a turbine distributor (not shown). The axial walls 3, 4 are interconnected at the upstream end by at least one end member having two fuel injection devices separated radially by a separator. The downstream zone of the combustion chamber 1 converges sharply towards its outlet 5, and the axial walls 3, 4 are provided with multiple perforations.

The axial walls 3, 4 are disposed at a distance from an inner casing 7 and an outer casing 8 respectively. The annular space 9 defined by the inner casing 7 and the inner axial wall 3 conducts a flow of air for diluting the gases in the downstream zone of the combustion chamber and cooling the axial wall 3. Similarly, the annular space 10 defined by the outer casing 8 and the outer axial wall 4 carries dilution air for supply to the downstream zone of the combustion chamber 1 and cooling air for the axial wall 4.

FIG. 1 indicates the local gas velocities in Mach numbers at various places within the combustion chamber, the pressure drops along the axial walls 3 and 4 as percentages of the pressure Pt in the annular spaces 9 and 10, and the cooling air flow rates De delivered to the combustion chamber per square meter of the walls 3 and 4 at different distances from the outlet 5 in the case where the permeability of the axial walls 3, 4 is homogeneous between its upstream and downstream ends, the permeability being defined as the air flow rate at the pressure Pt which can enter the combustion chamber 1 per unit area and at a given pressure drop.

As FIG. 1 shows, there is a 1 to 5 variation in the value M between the upstream and downstream ends of the downstream zone, the pressure drop increases towards the outlet 5 with a ratio close to 2 between the pressure drop near the outlet 5 and the pressure drop upstream of the downstream zone, and the rates of cooling air flow per square meter increase in the downstream direction and vary between 20 kg/m$^2$ and 24 kg/m$^2$.

This upstream-to-downstream variation in the cooling air flow rate impairs the performance of the combustion chamber and arises because of the decrease in the static pressure Ps of the combustion chamber gases between the upstream and downstream ends due to the increase in gas velocity.

Figure 2:
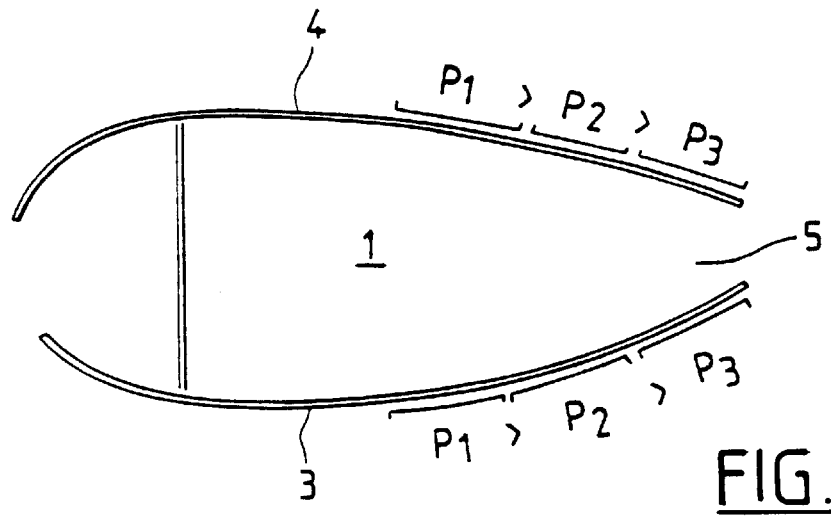
FIG. 2 shows a diagrammatic radial sectional view indicating how the cooling air flow permeability of the combustion chamber walls varies towards the downstream end in one embodiment of the combustion chamber in accordance with the invention.

FIG. 2 shows an embodiment of a combustion chamber 1 in accordance with the invention wherein the axial walls 3, 4 are provided with through holes forming multiple perforations for the entry of cooling air into the chamber 1, the cooling air flow permeability Pi of the rings forming the walls 3 and 4 in the downstream zone of the combustion chamber decreasing towards the chamber outlet 5. If P1, P2, P3 denotes the permeabilities of the three consecutive rings from the upstream to the downstream ends of the downstream zone of the combustion chamber 1, then P1>P2>P3.

The permeability can be varied by varying the number of through holes 12 of constant dimensions per unit area, or by varying the dimensions of the through holes 12.

It is also possible for the peripheral permeability to be varied along the axis and between the fuel injectors in order to optimize the local richness value. This arrangement can be determined by analysis of the results of a three-dimensional calculation.

Figure 3:
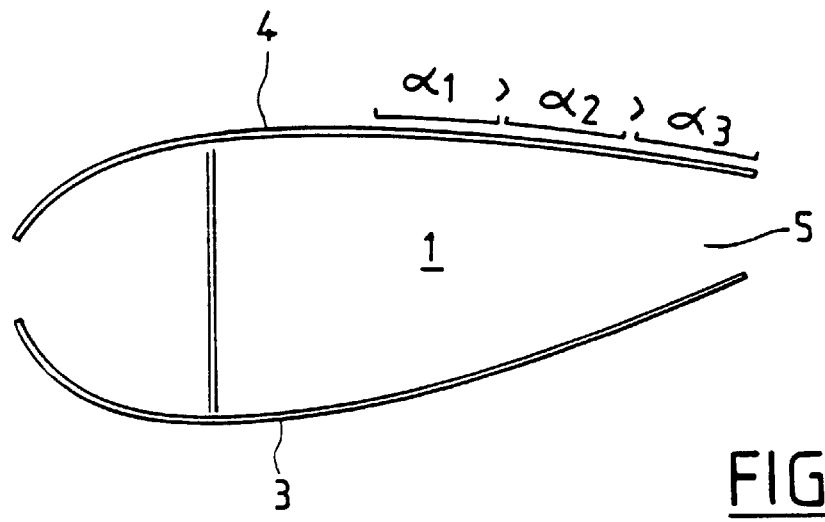
FIG. 3 is a view similar to FIG. 2, but indicating how the angle of inclination of the cooling air flow holes through the combustion chamber walls varies towards the downstream end in a second embodiment of the combustion chamber in accordance with the invention.
Figure 4:
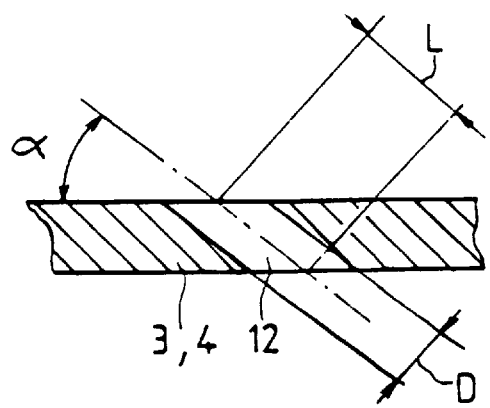
FIG. 4 is a sectional view of a through hole in the combustion chamber wall of the embodiment of FIG. 3 to indicate the angle of inclination of the hole.

As shown in FIGS. 3 and 4, another way of providing permeability variations in association with a homogeneous density of the through holes is to vary the axial inclination angle α of the holes 12. This solution makes it possible to adjust the flow rate coefficient of each orifice 12 as a function of the ratio between the length and the diameter (L/D) of the holes 12. If α1, α2, α3 denote the inclination angles of the holes 12 of three consecutive rings in the downstream zone of the combustion chamber 1 relatively to planes tangential to the rings at the entry of the holes 12, then α1>α2>α3.

Figure 5:
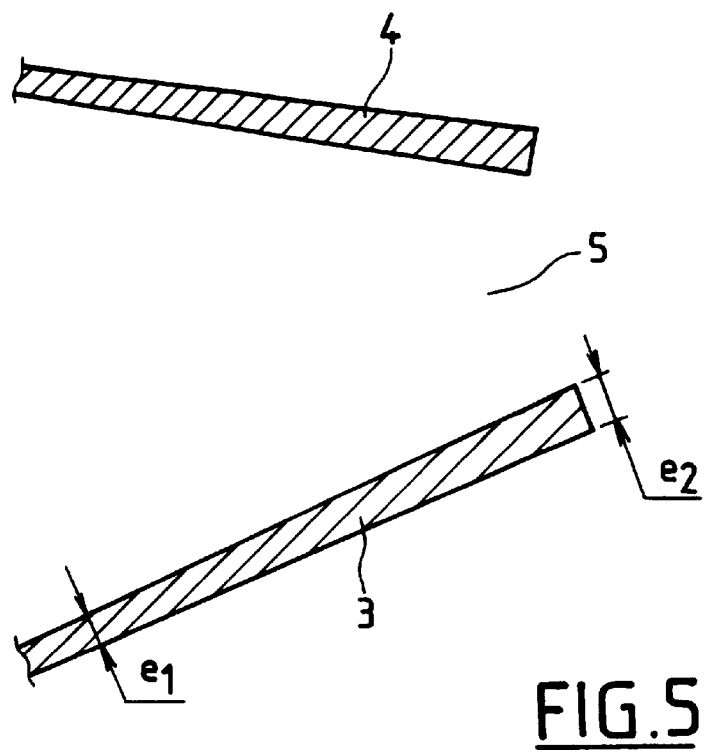
FIG. 5 is a schematic view illustrating another embodiment of the combustion chamber in accordance with the invention, in which the thickness of the combustion chamber walls increases towards the downstream end; and, FIG. 6 is a view similar to FIGS. 2 and 3, but showing a combustion chamber wherein the pressure drop is maintained substantially constant along the chamber walls by spoilers in the surrounding cooling air ducts.

The ratio L/D can also be varied, given a constant angle of inclination of the holes 12, by varying the thickness of the axial walls 3, 4 in the downstream zone of the combustion chamber, this thickness e increasing from the upstream to downstream end in the manner shown in FIG. 5.

If e1 denotes the thickness of the walls 3, 4 upstream of the downstream zone and e2 denotes the thickness of the walls 3, 4 near the outlet 5, then, for example, e1=0.7e2.

Figure 6:
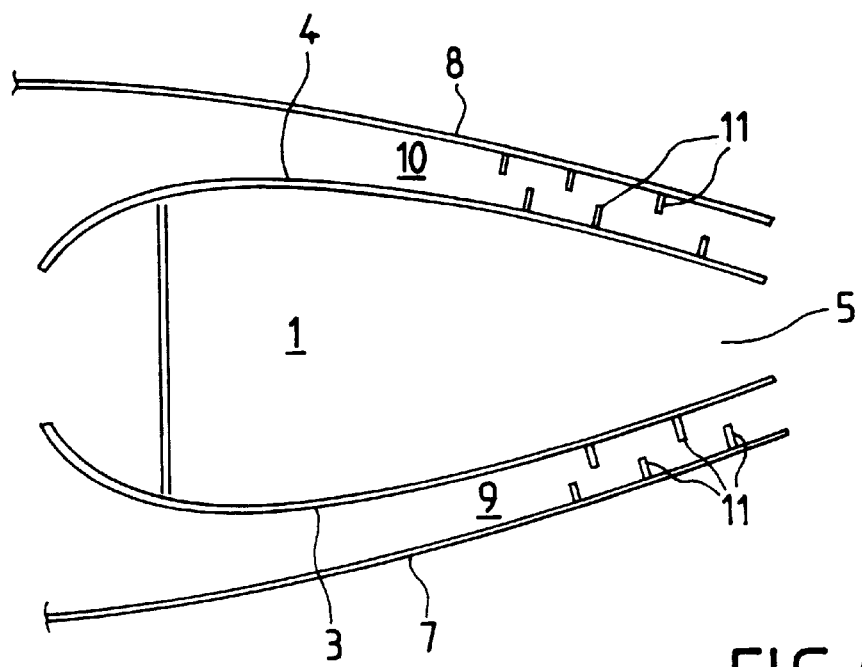

Finally, and as shown in FIG. 6, spoilers 11 can be disposed in a staggered relationship or as baffles on the chamber casings 7, 8 and the axial walls 3, 4 in the downstream portions of the annular spaces 9, 10 to preserve a constant pressure drop along the axial walls 3, 4.

It is also possible to control the rate of cooling air flow by combining the various solutions proposed and described above.

We claim:

1. A combustion chamber for a turbomachine, said chamber having an axis of symmetry and being bounded by two mutually spaced annular walls, an end member which is disposed transversely to said axis of symmetry at an upstream position with respect to a general direction of gas flow in said combustion chamber, and an outlet opening at a downstream end of said combustion chamber, each of said annular walls being provided with a plurality of through holes forming a plurality of perforations for the passage of air for cooling said walls, and said combustion chamber having a downstream zone in which a cross-section of said combustion chamber continuously converges towards said outlet opening at the downstream end thereof so as to cause an increase in velocity of the gas flow towards said outlet opening and locally increase a pressure drop along said annular walls in said downstream zone, wherein said multiple perforations are formed such that the cooling air flow permeability of said annular walls in said downstream zone decreases towards the downstream end of said combustion chamber in order to compensate for the effects of the increase in said pressure drop, said cooling air flow permeability being defined as the cooling air flow rate which can pass at a given pressure through a given area of wall experiencing a given pressure drop wherein the angle of inclination of said through holes relative to a plane tangential to the respective angular wall decreases from the upstream end to the downstream end of said downstream zone.

* * * * *

UNITED STATES PATENT AND TRADEMARK OFFICE
CERTIFICATE OF CORRECTION

PATENT NO. : 6,105,371
DATED : August 22, 2000
INVENTOR(S): Denis Roger Henri ANSART, et al.

It is certified that an error appears in the above-identified patent and that said Letters Patent is hereby corrected as shown below:

Title page, in the Title, delete "HAVING INCREASED PERMEABILITY IN THE DOWNSTREAM DIRECTION"

Title Page, in the Abstract, delete in its entirety and substitute

--ABSTRACT

A control device for air flow for cooling the axial walls of a high-temperature combustion chamber in which the walls are provided by the use of through holes forming a plurality of perforations, the device including an arrangement of perforations so that the cooling airflow permeability of the walls in the downstream zone of the chamber decreases in the downstream direction in order to compensate for the effects of an increase in pressure drop due to variation of the gas flow velocity. The control is particularly applicable to sharply convergent combustion chambers such as twin-head combustion chambers.--

Signed and Sealed this

Fifteenth Day of May, 2001

Attest:

NICHOLAS P. GODICI

Attesting Officer

Acting Director of the United States Patent and Trademark Office